Jan. 22, 1924. 1,481,774

S. G. COLE ET AL

PISTON RING

Filed March 18, 1922

Inventors
Setmon G. Cole and
O. D. Ginther,
By Watson E. Coleman
Attorney

Patented Jan. 22, 1924.

1,481,774

UNITED STATES PATENT OFFICE.

SELMON G. COLE AND ORA D. GINTHER, OF SAN DIEGO, CALIFORNIA.

PISTON RING.

Application filed March 18, 1922. Serial No. 544,865.

*To all whom it may concern:*

Be it known that we, SELMON G. COLE and ORA D. GINTHER, citizens of the United States, residing at San Diego, in the county of San Diego and State of California, have invented certain new and useful Improvements in Piston Rings, of which the following is a specification, reference being had to the accompanying drawings.

It is the purpose of the present invention to prevent the excessive oil or lubricant from passing or feeding between the cylinder wall and the piston, and upwardly into the combustion chamber of the cylinder as the piston reciprocates. As the piston travels downwardly in the cylinder one edge of the ring scrapes the oil or lubricant down and from the cylinder wall, and as the piston moves upwardly the other edge of the ring scrapes or cleans the oil or lubricant from the cylinder wall, thereby causing the lubricant to collect in a rabbet of the ring.

Another purpose is the provision of a plurality of notches on one face of the ring adjacent the rabbet, enabling the lubricant or oil to pass from the rabbet into the ring groove of the piston, and subsequently pass from the ring groove through apertures or openings or passageways in the piston wall, and deposit back into the crank case.

It is to be understood that the particulars herein given are in no way limitative and that while still keeping within the scope of the invention, any desired modifications of detail and desired proportions may be made in the apparatus according to circumstances.

The invention comprises further features and combination of parts, as will be hereinafter set forth, shown in the drawings and claimed.

In the drawings:—

Figure 1:
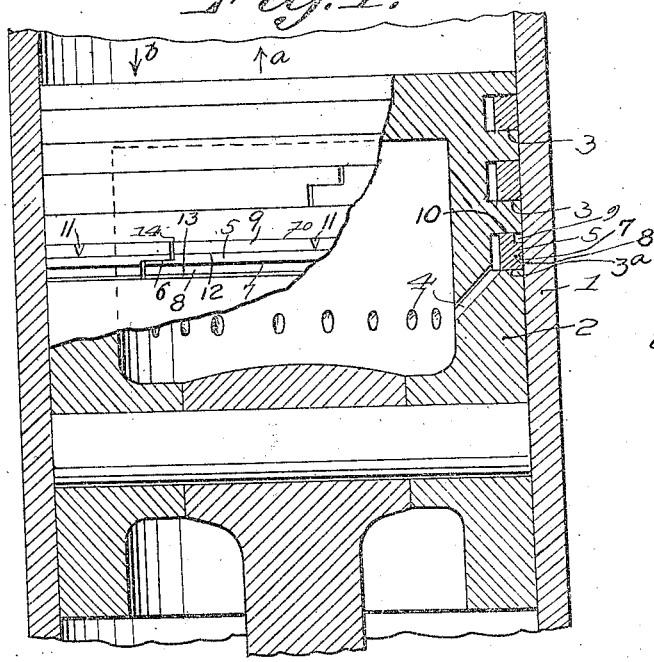
Figure 1 is a sectional view through a portion of an engine cylinder, showing a piston therein equipped with a plurality of piston rings, one of which is constructed in accordance with the invention.
Figure 2:
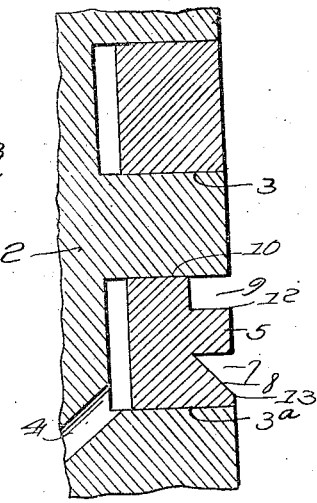
Figure 2 is an enlarged detail sectional view of a portion of the piston and the wall of the cylinder, showing the ring groove with the piston ring mounted therein, in order to clearly disclose the construction.

Referring to the drawings, 1 designates a portion of an engine cylinder, wherein a piston 2 is mounted. The piston is provided with a plurality of piston ring grooves 3 3ª there being a plurality of passageways or openings 4 communicatively connecting the lowermost ring groove 3ª and the interior of the piston, for the purpose of conveying oil or lubricant to the interior of the piston, from whence it may travel back into the crank case. Mounted in the ring grooves 3 of the piston are piston rings of the usual construction and in the ring groove 3ª an improved ring constructed in accordance with my invention is disposed. Each of the rings will be constructed in the usual manner and is of the split expansible metallic type.

Our improved ring has an annular groove or rabbet 7 on its outer face, and which is substantially V-shaped. The groove 7 comprises an upper wall, which is constructed at right angles to the cylindrical outer face of the ring, whereas its other or lower wall 8 is constructed at an inclination to the outer cylindrical face of the ring. This inclined wall 8 connects with the outer wall of the ring adjacent the bottom thereof and combines with the bottom wall of the ring to provide at the lower edge of the ring a restricted or narrow face 13 slidably abutting the wall of the cylinder.

The outer cylindrical face of the ring at a point vertically spaced from the groove or rabbet 7 is provided with an annular rabbet 9 removing the upper corner thereof, the lower wall of the rabbet being at right angles to the cylinder wall or to the axis of the ring. The upper face 10 of the ring is provided with a plurality of notches 11, preferably V-shaped, extending entirely thereacross and acting to connect the rabbet 9 with the back of the ring and accordingly when the ring is in position in the groove 3ª with the space between the back of the ring and the opposed wall of the piston.

As previously stated the ring is of the split expansible kind, due to the lap joint 6, so that when the ring is applied to the piston, it is sprung into the groove 6, and when the piston is inserted in the chamber of the cylinder, the ring is contracted sufficiently to permit it to enter the cylinder. Due to the ring being expansible, it is maintained in scraping contact with the wall of the chamber of the cylinder.

Upon the travel of the piston in the direction of the arrow $a$, the corner 12 of the piston ring, that is, adjacent the rabbet 9, acts to scrape the lubricant from the wall of the cylinder, so that the lubricant may collect in the rabbet 9, then it may travel through the notches 11, to the bottom of the ring groove 3, and then through the openings or passages 4 to the interior of the piston, from whence it travels back to the crank case. When the piston is traveling in the opposite direction indicated by the arrow $b$, the shallow edge 13 (which is adjacent the inclined wall of the groove or rabbet 7) and the face of the ring opposite the rabbet 9 will scrape the lubricant from the wall of the chamber of the cylinder. In other words the lubricant, when the piston is traveling in the direction of the arrow $b$, may be scraped off and from the cylinder wall, and collect in the groove or rabbet 7.

That portion of the lubricant collected in the groove 7 tends to pass through the ends of the lap joint as at 14, and enters the rabbet 9, from whence it may pass to and through the passages 4, into the interior of the piston, and thence back to the crank case.

Figure 3:
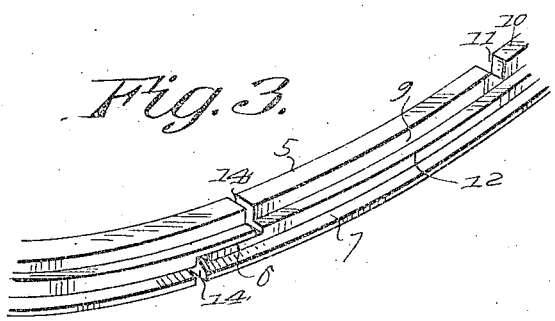
Figure 3 is an enlarged detail perspective view of a portion of the improved piston ring.
Figure 4:
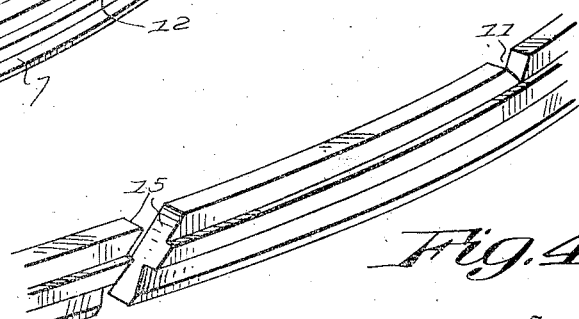
Figure 4 is an enlarged detail perspective view of a portion of a modified form of improved piston ring, wherein a beveled joint is employed in the ring, instead of a lap joint as in Figure 3.

In Figure 4 the ring is provided with a beveled overlapping joint 15, instead of the form of lap joint in Figure 3. In either case the ring is contracted sufficiently after it is applied to the piston, so that it may easily enter the chamber of the cylinder.

The invention having been set forth, what is claimed is:—

1. A piston ring adapted for use in the oil ring grooves of pistons having said oil ring groove in communication with the interior of the piston, comprising an expansible metallic ring adapted to be seated in the groove and adapted when seated to form between the back thereof and the opposed wall of the piston a chamber in communication with the interior of the piston, said ring being provided in its outer face with upper and lower rabbets, the upper wall of the lower rabbet and the lower wall of the upper rabbet being at substantially right angles to the axis of the ring, the lower wall of the lower rabbet merging with the outer face of the ring at a point slightly spaced above the lower edge of the ring, the upper rabbet being in communication with said chamber.

2. A piston ring adapted for use in the oil ring grooves of pistons having said oil ring groove in communication with the interior of the piston, comprising an expansible metallic ring adapted to be seated in the groove and adapted when seated to form between the back thereof and the opposed wall of the piston a chamber in communication with the interior of the piston, said ring being provided in the outer face with upper and lower rabbets, the upper wall of the lower rabbet and the lower wall of the upper rabbet being at substantially right angles to the axis of the ring, the lower wall of the lower rabbet merging with the outer face of the ring at a point slightly spaced above the lower edge of the ring, the upper rabbet in its formation removing the upper corner of the ring, the ring being provided in its upper face with a plurality of notches extending entirely thereacross and placing said rabbet in communication with said chamber.

In testimony whereof we hereunto affix our signatures.

SELMON G. COLE.
ORA D. GINTHER.